United States Patent Office 3,386,931
Patented June 4, 1968

3,386,931
COPOLYMERS OF CELLULOSE TRIESTERS AND ISOCYANATE CONTAINING POLYMERS
Charles L. Smart, Millington, and Donald K. Keel, Westfield, N.J., assignors to Celanese Corporation, a corporation of Delaware
No Drawing. Filed Aug. 16, 1965, Ser. No. 480,193
14 Claims. (Cl. 260—13)

ABSTRACT OF THE DISCLOSURE

A composition comprising a copolymer which is the reaction product of reactants including a soluble non-cellulosic polymeric material having unreacted isocyanate end groups and a high-molecular weight cellulose triester of a lower aliphatic acid, containing some free hydroxyl groups, in a substantially undegraded state, the reactants being employed in weight percentages ranging from about 10:90 to about 90:10.

---

This invention relates broadly to copolymers, to a method of preparing the same and to products made therefrom. More particularly it relates to the production of copolymers containing, combined in the copolymer molecule, (a) a high-molecular-weight polyanhydroglucose triester of an organic acid, especially a polyanhydroglucose (specifically cellulose) triester of one or more lower aliphatic acids, and (b) a non-cellulosic polymer. Still more particularly the invention is concerned with copolymers, including graft copolymers, wherein (a) high-molecular-weight cellulose triacetate having particular characteristics is combined in the copolymer molecule with (b) a non-cellulosic polymer containing unreacted isocyanate groups, the reactants of (a) and (b) being in a certain range of proportions with respect to each other thereby to obtain curable (including potentially curable) and cured copolymers having a new and unobvious combination of useful properties.

Copolymers including block copolymers, which are well known in the art, have heretofore been synthesized by linking "soft" polymer blocks, viz., low-melting polymers having relatively weak interchain attractive forces (e.g., polyesters and polyethers), with "hard" polymer blocks (e.g., polyurethanes and polyamides). Although various block copolymers heretofore have been synthesized, their field of utility has been restricted by the limited type of such copolymers that have been prepared.

In the copending application of Henry W. Steinmann, Ser. No. 379,386, filed June 30, 1964, and assigned to the same assignee as the present invention, are disclosed and claimed copolymers, including block copolymers, wherein there is combined in the copolymer molecule low-molecular-weight cellulose triacetate, that is cellulose triacetate ($CA_3$) having an average molecular weight of from about 1000 to about 5000, an inherent viscosity (I.V.) of from about 0.05 to about 0.4 deciliter per gram (i.e., dl./g.), and an acetyl value of at least about 56%, more particularly at least about 60%.

The $CA_3$ employed in practicing the invention of Steinmann is degraded $CA_3$, that is, $CA_3$ which has been depolymerized (while maintaining the acetyl groups thereof substantially intact), by contacting high-molecular-weight $CA_3$ with an acid catalyst, e.g., sulfuric or perchloric acids, or boron trifluoride. Degradation is effected while the $CA_3$ is in a solvent, e.g., a mixture of, by weight, 98.5–99.5% acetic acid and 0.5–1.5% water. The resulting low-molecular-weight $CA_3$ is recovered and reacted with a coupling agent, e.g., an organic diisocyanate, and a soft polymer, e.g., a low-molecular-weight polyester or polyether containing reactive terminal groups, to yield a block copolymer containing low-molecular-weight $CA_3$ coupled to a polyester or a polyether by means of the organic diisocyanate coupling agent.

The block copolymers of the invention of Steinmann are essentially linear, segmented, elastomeric copolymers comprising two principal or main types of segments chemically connected and alternating in the copolymer chain. One segment, preferably substantially amorphous, may be derived from low-melting soft polymers, e.g., polyester, polyethers, and the like; while the other segment is derived from the depolymerized, low-molecular-weight $CA_3$ segments briefly described above and more fully in Steinmann's aforementioned copending application Ser. No. 379,386. The preferred block copolymers of Steinmann's invention generally soften and melt below that of high-molecular-weight $CA_3$.

The present invention is based on our discovery that mixtures, in solution, of (a) soluble polymeric material having unreacted isocyanate ends and (b) high-molecular-weight $CA_3$, containing some free hydroxyl groups, in substantially undegraded state or form can be converted into products, e.g., filamentary materials including fibers, filaments (both mono- and multifilaments), tow, etc., as well as films, sheets, tapes, ribbons, rods, bars, tubes, and other shaped articles that, upon being cured, become almost if not completely insoluble.

Surprisingly and unobviously cured articles, specifically cured films, made from the preferred copolymers of the invention, e.g., a copolymer of, by weight, about 20% isocyanate-modified polyester units or segments and about 80% high-molecular-weight $CA_3$ units or segments show greater tensile strength, percent elongation, solvent resistance, disperse dyeability and flexibility as compared with a control specimen film consisting of 100% high-molecular-weight homopolymeric $CA_3$. Hence by practicing the present invention one can produce films that are adapted to be used, for example, to make recording tapes, movie films and the like, and which are tough, transparent and flexible as compared with cellulose acetate films that are characterized by having only limited flexibility.

The instant invention also provides insoluble (substantially completely insoluble) fibers that are more flexible and have greater tensile strength, elongation and abrasion resistance as compared with 100% high-molecular-weight $CA_3$ fibers. Furthermore, the copolymer can be made from commercially available starting materials, and the process can be placed in commercial operation to make films and fibers with a minimum modification of the equipment and overall process normally employed in producing fibers from 100% high-molecular-weight $CA_3$, and with perhaps only somewhat different film-forming or coating equipment in making films. Additionally, the dye-receptivity of the copolymers of the invention with respect to certain types of dyes, e.g., disperse dyes, is markedly improved as compared with that of 100% high-molecular-weight $CA_3$.

High-molecular-weight organic esters of polyanhydroglucoses, more particularly organic esters of cellulose, are known. Among such esters that may be used in practicing this invention are the high-molecular-weight cellulose triesters of a lower aliphatic acid, and more particularly a lower alkanoic acid including the $C_1$ through $C_4$ alkanoic acids and mixtures thereof with each other and with formic acid. More specific examples of such triesters are cellulose triacetate, which is preferred; also, cellulose tripropionate, cellulose tributyrate, cellulose tri-(acetopropionate), cellulose tri-(acetobutyrate), cellulose tri-(propionobutyrate), and the like. Also within the concept of the invention is the use of tri-aliphatic acid esters of polyanhydrogulcoses other than cellulose, e.g., the triacetate and other tri-(lower alkanoic acid) esters of carbohydrates such as, for example, starch and glycogen.

The organic triesters employed in this invention are in substantially undegraded state, that is, they have been given no special treatment to effect depolymerization thereof. In this respect they are materially different from the organic triesters used by Steinmann in practicing the invention described in his aforementioned copending application. These differences in the constitution and properties of the starting $CA_3$ reactants used by Steinmann and the present applicants are reflected in the constitution and properties of the copolymers resulting from practicing the respective inventions; and these differences are differences in kind and not merely in degree so that a field of utility for which one is eminently suitable may be wholly unsuited for the other.

In practicing this invention the high-molecular-weight polyanhydroglucose or polysaccharide triester of an organic acid that is employed is preferably a cellulose triester and, more particularly, a cellulose triester of a lower aliphatic acid, specifically cellulose triacetate, which is in substantially undegraded state. The triester reactant, e.g., cellulose triacetate, contains some free hydroxyl groups. More particularly it has:

(a) An average of less than about 0.29, e.g., from 0.05 to 0.28, free hydroxyl group per anhydroglucose unit in the cellulose molecule;

(b) At least about 59% acetyl groups calculated as combined acetic acid, i.e., a so-called "acetyl value" (A.V.) of at least 59% acetic acid; and (c) An inherent viscosity (I.V.), which also may be designated as a regenerated inherent viscosity, of from about 1.5 to 3.0 dl/g.

Preferably the cellulose triester such as the triacetate has an average of less than about 0.12, e.g., from 0.05 to 0.11, free hydroxyl group per anhydroglucose unit in the cellulose molecule; at least about 61% acetyl groups calculated as combined acetic acid; and an inherent viscosity of from between 1.7 to 2.0 up to about 3.0 dl/g. Preferably commercial high-molecular-weight $CA_3$ having acetyl values between 61 and 62.4%, more particularly from 61.5 to 62.3% are employed.

The term "inherent viscosity" (I.V.) as used in this specification and in the appended claims is defined as $$I.V. = \frac{\ln \eta_r}{c}$$

wherein $\eta_r$ is the relative viscosity of the solution; that is, the viscosity of a solution of 0.5 gram of $CA_3$ in 100 milliliters of a 9 to 1 mixture of methylene chloride-methanol solvent at 30° C. divided by the viscosity of the solvent in the same units as the solution and at the same temperature, and wherein c is the concentration of the $CA_3$ solution in grams of $CA_3$ per 100 milliliters of solution. The inherent viscosity is thus expressed in deciliters per gram.

The aforementioned inherent viscosities of from about 1.5 to about 3.0 dl/g. for the cellulose triesters such as cellulose triacetate employed in practicing this invention correspond, in general, to molecular weights ranging from about 43,000 to about 86,000.

A wide variety of copolymers can be produced in accordance with this invention by effecting reaction between a high-molecular-weight cellulose triester such as cellulose triacetate of the kind above described and a non-cellulosic polymer having terminal functional groups, i.e. groups containing active hydrogen. By appropriate selection of the reactants, especially the non-cellulosic polymer, and the relative proportions of each, curable copolymers can be produced that are soluble in organic solvents and from which can be made cured films, fibers and other shaped articles having the unique, desirable combination of properties mentioned earlier in this specification.

Particularly useful copolymers of this invention are those involving the reaction of (a) organic polyisocyanates, especially the diisocyanates (both aromatic and aliphatic diisocyanates), with (b) terminal active hydrogen-containing groups of polyesters and/or polyesters or similar or equivalent polymers possessing terminal functional groups and with (c) hydroxyl groups of high-molecular-weight $CA_3$ or other triester of cellulose or the like and a lower alkanoic acid. By such a reaction one can obtain a soluble, curable copolymer that can be cured (as by cross-linking) to an insoluble or a difficulty soluble state. Instead of using isocyanates as described above and elsewhere in this specification as the linking agent between the different polymeric units or segments, one may use other types of linking agents. For instance, one may use phosgene to form carbonate linkages; bis-carbamyl chlorides to form urethane linkages; diacid chlorides such as isophthalyl chloride or dianhydrides such as pyromellitic anhydride to form ester linkages; or difunctional silanes such as dischlorodimethyl silane to form ether linkages.

Illustrative examples of polyhydroxy compounds that may be used individually or admixed with each other to prepare the polyester or polyether segments or components of the copolymers of this invention are: ethylene glycol, diethylene glycol, triethylene glycol, pentamethylene glycol, hexamethylene glycol, decamethylene glycol, dodecamethylene glycol, propylene glycol, 1,2-propylene glycol, 1,3-propylene glycol, butanediol-1,2, butanediol-2,3, butanediol-1,3, butanediol-1,4, isobutylene glycol, pinacol, hexanediol-1,4, pentanediol-1,5, 2-methyl-2,4-pentanediol, heptanediol-1,7, heptanediol-1,4, thiodiglycol, n-butyldiethanolamine, N,N-diethanolaniline, hydroquinonediglycol ether, transhexanhydroxylene glycol; and the ortho- and meta-dihydroxybenzenes.

Illustrative examples of polycarboxylic acids, more particularly dicarboxylic acids, that may be employed with polyhydroxy compounds, especially dicarboxylic acids, to prepare the polyester components or segments of the copolymers of this invention are: adipic, beta-methyladipic, azelaic, fumaric, glutaric, 2-phenylglutaric, malic, maleic, malonic, sebacic, suberic, succinic, pimelic, 4-ketopimelic, itaconic, dehydromuconic, decane-1,10-dicarboxylic, ketoundecanedioic, acetylenedicarboxylic, acetone dicarboxylic, diphenic, p-phenylenediacetic, phthalic, isophthalic, terephthalic, hexahydroterephthalic, cyclopentane-1,2-dicarboxylic, cyclopentane-1,3-dicarboxylic, cyclohexene-1,2-dicarboxylic, cyclohexane-1,4-dicarboxylic, naphthalene-1,2-dicarboxylic, naphthalene-1,3-dicarboxylic, naphthalene-1,4-dicarboxylic, naphthalene-1,5-dicarboxylic, diphenylene-2,2-dicarboxylic, diphenylene-4,4'-dicarboxylic, diphenylene-2,4'-dicarboxylic, xylylene-1,4-dicarboxylic, xylylene-1,3-dicarboxylic, xylylene-1,2-dicarboxylic, and camphoric.

Mixtures of polycarboxyl compounds may be used as desired or as conditions may require.

The method chosen to prepare the polyesters and polyethers is not critical to this invention, and any of the synthetic methods known in the art may be employed in producing such polymers.

Illustrative examples of polyethers and polyesters that can be prepared from the polyhydroxy and polycarboxyl compounds mentioned hereinbefore by way of illustration and used in practicing the present invention include: poly(ethylene oxide)glycols; poly(propylene oxide)glycols; poly(tetramethylene oxide)glycols; poly(hexamethylene oxide)glycols; esterification or reaction products of: ethylene glycol and adipic acid; diethylene glycol and adipic acid; propanediol and sebacic acid; ethylene glycol and sebacic acid; diethylene glycol and sebacic acid; ethylene glycol, propylene glycol and adipic acid; phthalic acid, adipic acid and hexanetriol; 2,2-dimethyl-1,2-propanediol and sebacyl chloride; and 2,2-dimethyl-1,3-propanediol and dimethyl sebacate.

Mixtures of polyesters and polyethers may be employed in any proportions, as desired or as may be required to impart particular properties to the cured product.

Illustrative examples of organic polyisocyanates that may be used in practicing this invention are the various polymethylene (i.e., multimethylene) diisocyanates including, for instance, the tri-, tetra-, penta-, hexa- and deca-methylene diisocyanates; cyclopentylene-1,3-diisocyanate; 1,4-diisocyanato cyclohexane; the various phenylene diisocyanates including the meta- and para-phenylene diisocyanates; the various tolylene diisocyanates including tolylene-2,4-diisocyanate and tolylene-2,6-diisocyanate; the various naphthalene diisocyanates; 4,4'-diphenylmethane diisocyanate; and 4,4'-diphenylpropane diisocyanate. Other examples include:

4-isopropyl-1,3-phenylene diisocyanate
4-methoxy-1,3-phenylene diisocyanate
2,4-diisocyanato-diisopropyl-1,3-phenylene diisocyanate
4-chloro-1,3-phenylene diisocyanate
3,3'-dimethyl-4,4'-diisocyanatodiphenyl methane
3,3'-bitolylene-4,4'-diisocyanate
2,4-diisocyanatodiphenyl ether
4,4'-methylene-bis(phenylisocyanate)
Mesitylene diisocyanate
o-Nitrobenzidine diisocyanate
Durylene diisocyanate
Benzidine diisocyanate
4,4'-diisocyanato dibenzyl
1,5-naphthalene diisocyanate
Liquid polymethylene polyisocyanate (PAPI)
1,3,5-benzene triisocyanate
Tolylene-2,4,6-triisocyanate
2,4,4'-triisocyanatodiphenyl ether
Tritolylmethane triisocyanate Still other examples of organic polyisocyanates that may be used in carrying the instant invention into effect are the reaction product of tolylene diisocyanate with trimethylolpropane at an NCO/OH ratio of 2:1, and the reaction product of tolylene diisocyanate with 1,2,6-hexanetriol at an NCO/OH ratio of 2:1.

As has been indicated hereinbefore, the present invention is directed particularly to the preparation of curable and cured copolymers, more particularly graft copolymers, that include essentially a high-molecular-weight polyanhydroglucose triester such as a cellulose triester of a lower aliphatic acid, specifically cellulose triacetate, combined in the copolymer molecule.

The curable copolymers of the invention are predominantly linear or thermoplastic, segmented copolymers comprising two principal types of segments chemically connected in the copolymer chain. One segment, preferably substantially amorphous, may be derived from low-melting soft polymers such as, for example, polyesters, polyethers and the like; the other segment is preferably derived from the high-molecular-weight cellulose triester, specifically cellulose triacetate, hereinbefore described.

More particularly, the soft segments of the copolymers are preferably derived from low-melting polymers having a melting point below about 60° C., having an average molecular weight ranging from about 250 to about 5000, and containing terminal radicals possessing active hydrogen atoms. These soft segments, as present in the copolymer, appear as radicals of the initial polymers from which the active hydrogen atoms have been removed. Generally, the hard, high-melting segments derived from the cellulose triester (or equivalent) triester of other polyanhydroglucose) comprise from about 90% to about 10%, preferably from about 50% to about 80%, and specifically about 30%, by weight of the segmented copolymer; and may be further defined as comprising at least one repeating unit of the linear hard polymer from which they are derived.

A suitable soft segment of the block copolymers of the invention may be represented by the formulas

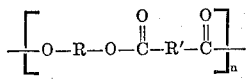

and

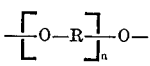

where R and R' represent divalent organic radicals, more particularly divalent hydrocarbon radicals, containing terminal functional groups and $n$ is a number such that the average molecular weight of the segment ranges from about 250 to about 5000.

Although the polyesters and/or polyethers or similar soft polymers employed in practicing this invention can have a wide variety of terminal functional groups containing active hydrogen atoms, e.g., hydroxyl, carboxyl, amino, amido, etc., it is preferred to use compounds terminating with carboxyl and/or hydroxyl groups. Thus when compounds with terminal hydroxyl groups are employed, the reaction of such compounds with an organic polyisocyanate such as a diisocyanate forms urethane linkages; while compounds terminated with carboxyl groups when similarly reacted yield primarily amide linkages. The hard segments of the copolymers including graft copolymers are derived from, for example, high-molecular-weight organic triesters such as the cellulose triacetate previously described.

From the foregoing description it will be seen that the present invention provides compositions comprising a copolymer which is a reaction product of reactants including or consisting essentially of A. An organic polyisocyanate, preferably an organic diisocyanate, e.g., tolylene diisocyanate or mixture of tolylene diisocyanates;

B. A non-cellulosic polymer containing terminal functional groups, e.g., at least one polyester and/or at least one polyether, the said polyester and/or polyether having an average molecular weight within the range of from about 250 to about 5000 and containing terminal functional groups reactive with an isocyanate, e.g., hydroxyl groups, and C. A high-molecular-weight cellulose triester of a lower aliphatic acid, e.g., a lower alkanoic acid, and specifically cellulose triacetate.

The cellulose triester (i.e., reactant C) contains some free hydroxyl groups, is in substantally undegraded state, and has the other characteristics previously set forth in detail. Reactant C constitutes, by weight, from about 90% to about 10%, preferably from about 50% to about 80%, and specifically about 80% of the total weight of the reactants of A, B and C. The reaction between the aforesaid reactants to obtain a curable copolymer is effected under anhydrous (substantially completely anhydrous) conditions.

The invention also provides compositions comprising a copolymer, or more particularly a graft copolymer, which is a reaction product of reactants including or consisting essentially of (a) A non-cellulosic polymer (prepolymer) containing unreacted isocyanate groups, e.g., a polyurethane containing unreacted isocyanate groups, and (b) A high-molecular-weight cellulose triester of the kind described briefly with respect to reactant C in the preceding paragraph and more fully in the earlier part of this specification.

The reactants of a and b defined in the preceding paragraph are employed in weight percentages ranging, respectively, from about 10:90 to 90:10, preferably from about 50:50 to about 50:80, and specifically in weight percentages of about 20% of a and about 80% of b. The reaction between these reactants to obtain a curable copolymer is effected under anhydrous conditions, and, preferably, in an organic liquid medium. The organic liquid medium is normally a volatile (volatilizable) organic liquid medium such as, for example, a lower alkylenehalide, especially the chloride, bromide or chloridebromide, and still more particularly methylene chloride and/or ethylene chloride. Chloro-fluorohydrocarbons such as the various Freon® chloro-fluoro hydrocarbons also may be used as the liquid reaction medium.

The solution of the curable copolymer may be cast, extruded through an orifice, or otherwise shaped into the form of a film, ribbon, tape, or other sheet or sheet-like material; or it may be extruded through an orifice or otherwise shaped to form films or fibers, rods, bars, tubes and other shaped articles. The unshaped or shaped curable copolymer can be cured by, for example, bringing it into contact with $H_2O$ in liquid or vapor form. For instance, it can be cured by mere exposure to moist atmospheric condtions, i.e., an atmosphere containing water vapor.

The properties of the curable (including potentially curable) copolymers and of the cured copolymers can be varied over a wide range depending upon such influencing factors as, for example, the particular reactants employed, the relative proportions thereof, and the particular technique followed in bringing the reactants into reactive relationship.

The amount of organic polyisocyanate such as a diisocyanate employed is a particularly important factor in controlling the properties of the final cured copolymer. This amount will also depend upon the particular weight ratio of cellulose triester to the soft polymer component such as a polyether and/or polyester. When a polyurethane prepolymer is first made, which is the preferred procedure, and this prepolymer is then brought into reactive relationship with the cellulose triester, the amount of polyisocyanate which is caused to react with the soft polymer is such that the latter contains an average of, for example, from about 0.5 to about 6, preferably from about 2 to about 4, weight percent free isocyanate calculated as —NCO, and which is over and above that needed for reaction with the functional terminal groups of the soft polymer, e.g., carboxyl and/or hydroxyl groups.

Taking tolylene diisocyanate (TDI) as illustrative of a polyisocyanate, specifically a diisocyanate, and a polyester having a hydroxyl number of 32 and an acid number of 2 as illustrative of a soft polymer reactant having terminal functional groups, the following equation may be used to calculate the amount of TDI needed to obtain perpolymers having the aforementioned calculated amount of free —NCO:

$$\frac{\text{gms. TDI}}{100 \text{ gms. polyester}} = (\text{Acid No.} + \text{—OH No.}) \times 0.155 + \frac{(\text{percent free—NCO}) \, 100}{48.3 - (\text{percent free—NCO})}$$

From this equation it can be calculated that 20 gms. of the aforementioned polyester requires 1.9 gms. of TDI to obtain a prepolymer containing about 2 weight percent of free —NCO, and about 2.8 gms. of TDI to secure a prepolymer containing about 4 weight percent of free —NCO.

As has been indicated hereinbefore, the copolymerization reaction is preferably carried out in a liquid medium comprised of an organic solvent, more particularly halogenated hydrocarbons and especially aliphatic (including saturated aliphatic) hydrocarbons, e.g., the chlorinated and the brominated $C_1$–$C_4$ aliphatic hydrocarbons, and the $C_1$–$C_4$ aliphatic hydrocarbons which are both chlorinated and brominated or both chlorinated and fluorinated. Methylene chloride and/or ethylene chloride are preferred among the halogenated hydrocarbon solvents and, of these two solvents, in most cases methylene chloride is preferable to ethylene chloride.

A wide variety of catalysts such as those commonly employed in catalyzing the formation of polyurethanes may be employed in the copolymerization reaction and/or in the separate preparation of a prepolymer. Among such catalysts may be mentioned organic metal esters including organic tin esters such as, for example, dibutyl tin dilaurate (M & T Chemicals, Inc.'s T–12 or other similar compounds, e.g., T–9, etc.); and the various tertiary amines including, for instance, triethylamine, tributylamine, triethanolamine, tri-isopropanolamine, N-methyl morpholine, etc.

The polymerization reaction can be carried out at ambient temperature (20°–30° C.) or at an elevated temperature, and at atmospheric pressure or at autogenous pressure.

Various permutations of reactants may be employed in producing the copolymers of this invention. For example, the organic polyisocyanate such as an aromatic or aliphatic diisocyanate (preferably an aromatic diisocyanate) may be added to a solution containing both the cellulose triester and the soft polymeric reactant(s) having terminal functional groups, e.g., a low-molecular-weight polyester and/or a polyether with terminal hydroxyl groups. Alternatively, the organic polyisocyanate may be first reacted with high-molecular-weight cellulose triester to yield a prepolymer having residual isocyanate groups, which prepolymer is then reacted with soft polymeric reactant(s) having terminal functional groups.

Still another and the preferred procedure is to first react the organic polyisocyanate with a polyester and/or polyether and/or other soft polymer having terminal functional groups thereby to obtain a prepolymer having residual isocyanate groups. The reactive prepolymer, more particularly a polyurethane containing unreacted isocyanate groups, is then reacted with the high-molecular-weight cellulose triester. In carrying out this procedure, the reaction to form the reactive prepolymer is usually effected at 60° C. or lower, but due to the exothermic reaction it may rise to 80°–120° C.; while the reaction of the prepolymer with the high-molecular-weight cellulose triester is preferably carried out at a temperature within the range of from ambient temperature (20°–30° C.) to about 80° C.

When the permutation of reactants is such that the organic polyisocyanate is added to a solution containing both the cellulose triester and the soft polymeric reactant(s) having terminal functional groups, it is believed that this procedure results or tends to result in graft copolymers.

Whatever the sequence of operations employed in producing the curable copolymers, it is desirable that the reaction be effected under anhydrous (substantially completely anhydrous) conditions. The obtainment of such conditions is facilitated by carrying out the reaction in an inert atmosphere, i.e., under an atmosphere of dry nitrogen, argon, helium or other dry inert gas.

An advantage of using methylene chloride and/or ethylene chloride as the reaction medium resides in the fact that these compounds are solvents for the starting reactants as well as for the curable copolymers resulting from the reaction. Furthermore, the use of such solvents provides convenient means for drying the reaction system by azeotropic distillation prior to the addition of the organic polyisocyanate. Generally, this procedure consists in dissolving the soft polymer containing terminal functional groups in a small amount of ethylene chloride, and then drying the system by azeotropic distillation to leave a more highly concentrated solution of the soft polymer. The organic polyisocyanate is then added and reacted with the polyester and/or polyether or other soft polymer containing terminal functional groups.

In a separate vessel the high-molecular-weight cellulose triester is dissolved in methylene chloride and/or ethylene chloride, and this system is also dried by azeotropic distillation. If desired, further drying can be effected by passing the solution through a bed of silica gel. After the reaction of the organic polyisocyanate with the soft polymer has been completed, the organic solvent solution thereof is added slowly with stirring to an organic solvent solution of a calculated amount of high-molecular-weight cellulose triester. Additional methylene chloride and/or ethylene chloride solvent may be added to either or both of the aforementioned solutions of the reactants in order to obtain a solution of curable copolymer having an optimum concentration of copolymer solids for casting a film, extruding a fiber or otherwise forming a shaped article from the said copolymer. The concentration (on a net dry solids basis) of the curable copolymer in the organic solvent medium for use in making a shaped article may range, for example, from about 5% to about 35%, more particularly from about 15 to about 30%, and preferably from about 20 or 25%, by weight of the solution. The concentration may be adjusted by adding more solvent to, or vaporizing off some of the solvent from, the solution of the soluble curable copolymer as initially formed in solution in order to obtain a solution or "dope" having a concentration of copolymer best adapted for a particular use.

The rate of the reaction between the reactants is catalyzed by tertiary amines and other catalysts but it is also dependent upon the concentration of the reactants in the solution, the reaction temperature and the kind of organic polyisocyanate employed, e.g., whether the polyisocyanate is a diisocyanate or a triisocyanate. To a lesser extent the rate of reaction is also dependent upon the amount of organic polyisocyanate that is present in the reaction mass. Copolymerization is usually evidenced initially by an increase in the viscosity of the solution and, in its final aspects, by an increase in the inherent viscosity of the curable copolymer.

In general, the conditions for increased rate of reaction are high temperature, high concentration of reactants and excessive amounts (i.e., amounts substantially in excess of the theoretical) of organic polyisocyanate. However, in some cases it is actually desirable to retard the reaction in the later stages of polymerization, especially when an excessive amount of an organic polyisocyanate is employed. The purpose of retarding the polymerization in the later stages when using an excess of an organic polyisocyanate is to prevent, or lessen the possibility of, gelation of all or part of the reaction mass. Inhibition of the reaction can be conveniently accomplished by diluting the reaction solution and/or carrying out the reaction at a lower temperature. The reaction is continued to the desired viscosity short of gelation, after which the solution of the curable copolymer is cast to form films, extruded to form films or fibers, or otherwise converted into shaped articles. The shaped, curable copolymer is then freed of excess solvent, followed by or at least in part concurrently with conversion of the copolymer to a cured state, e.g., by bringing the curable copolymer in contact with $H_2O$ in vapor or liquid form.

In general, cured copolymers (e.g., in film form) containing less than about 15% by weight of soft polymer segments, e.g., polyesterurethan and/or polyetherurethane segments, are soluble in a lower alkylene chloride, e.g., methylene chloride; while those containing appreciably above 15% by weight of the aforesaid soft polymer segments, e.g., from about 20% to 90% and higher, are insoluble (but swell) in a solvent such as methylene chloride. Films of cured copolymers of the invention, as well as films of 100% high-molecular-weight $CA_3$ used as a starting reactant, are insoluble (but swell) in such compounds as acetone and benzene.

Films, fibers and other shaped articles made from the copolymers of this invention have excellent dye-receptivity, especially with regard to basic dyes and disperse dyes. For example, all copolymer films containing 10% or more by weight of polyurethane segments in the copolymer molecule were dyed a dark blue color when boiled in a disperse dye (Blue BNN) bath. In marked contrast, a film of 100% high-molecular-weight $CA_3$ remained almost colorless when boiled in the same dye bath.

The copolymer films of the invention also, in general, are characterized by their toughness, flexibility and transparency as compared with 100% $CA_3$ film. Tensile strengths vary, for example, from about 5,800 p.s.i.g. to about 20,000 p.s.i.g., and percent elongations from about 11 to about 480. In general, the copolymers containing a small amount, e.g., about 20%, of polyurethane segments, result in an increase in both tensile strengths and percent elongations.

In order that those skilled in the art may better understand how the present invention can be carried into effect, the following examples are given by way of illustration and not by way of limitation. All parts and percentages are by weight unless otherwise stated.

Example 1

This example illustrates the preparation of two different samples of 100% polyesterurethanes by reaction of a polyester containing terminal functional groups with an organic polyisocyanate, specifically tolylene diisocyanate (TDI), and the production of films from these polyurethanes. One sample is prepared so that it contains a calculated 2% free —NCO and the other, a calculated 4% free —NCO. As was explained in a portion of the specification prior to the examples, the stated calculated percentages are in addition to that required for the carboxyl and hydroxyl content of the polyester. The polyester employed (R.C.A. Polyester D-6) is a commercially available polyester of a mixture of ethylene glycol and propylene glycol with adipic acid. It has an Acid No. of about 0.5, a Hydroxyl No. of about 37 and an average molecular weight (M.W.) of about 2500.

|  | Sample No. 1 2% Free —NCO (g.) | Sample No. 2 4% Free —NCO (g.) |
| --- | --- | --- |
| R.C. Polyester D-6 | 20.0 | 20.0 |
| TDI | 1.9 | 2.8 |
| Dibutyl tin diester of a long-chain monocarboxylic (M & T Chemicals, Inc.'s (T-9)) | 0.1 | 0.1 |

The polyester is weighed into a 100 ml. beaker and heated to 90° C. (To the polyester previously may be added a small amount of a tertiary amine, e.g., about 1% of triethyl amine, triethanolamine of tri-isopropanol-amine.) The TDI is quickly incorporated, followed by the immediate addition of the dibutyl tin diester catalyst and degassing under vacuum. The reaction mass is then cast or poured onto a polished plate which may be coated with a silicone or other type of release agent. In casting films extreme care is taken to avoid entrapment of any air, or exposure of the urethane prepolymer to moisture until after the film has been cast.

If desired, a small amount (e.g., about 10%) of an aromatic hydrocarbon, e.g., toluene, may be added to the polyester, prior to effecting the above-described reaction, in order to facilitate handling. Substantially all of such added toluene is vaporized during curing of the copolymer.

The prepolymer is cast to form wet films about 20 mils thick, which are air dried until almost entirely free of solvent, and are then cured. Curing is effected by oven treatment of the cast films for from 1 to 3 hours at 80° C., followed by exposure to ambient humid atmospheric temperature (about 30° C.) for from about 16 to 72 hours. Curing of the films also may be effected by exposure to ambient humid atmospheric temperature for from about 3 to 14 days. In general, the cure time varies with the temperature, film thickness and free —NCO content. The maximum physical properties develop after further aging of the self-supporting film for a few days at ambient atmospheric temperatures. Typical physical properties of the cured and aged films are shown below:

|  | Tensile Strength, p.s.i.g. | 100% Modulus, p.s.i.g. | Percent Elongation |
| --- | --- | --- | --- |
| Sample No. 1 (2% free—NCO) | 5,100 | 220 | 710 |
| Sample No. 2 (4% free—NCO) | 6,800 | 250 | 700 |

Example 2

This example illustrates the preparation of curable copolymers containing varying calculated percentages, specifically 25, 50, 75 and 90%, of a polyesterurethane, and high-molecular-weight cellulose triacetate containing some free hydroxyl groups constituting the remainder. Films are made from solutions of the curable copolymers.

A. In making the copolymers of 25% and 50% urethane contents, the dibutyl tin dilaurate-catalyzed urethane prepolymer in each case is made as described with reference to the 4% —NCO sample under Example 1 (omitting the addition of any tertiary amine), and each is then diluted with twice its weight of methylene chloride. The resulting solution at ambient temperature is, in each case, slowly added to the calculated amount of solution of cellulose triacetate while stirring the latter. The cellulose triacetate solution also is at ambient temperature. The resulting clear solution are then ready for casting or drawing films.

B. The same procedure described in the preceding paragraph is followed in making the copolymer of 75% urethane content with the exception that the urethane prepolymer is diluted with 1.5 times its weight of methylene chloride, and the resulting solution is slowly added to the solution of cellulose triacetate which has been further diluted with half its weight of methylene chloride. A clear solution of curable copolymer, suitable for casting or drawing films, is obtained.

C. In making a copolymer of 90% urethane content, the same procedure is followed as described under A of this example with the exception that the urethane prepolymer is diluted with an equal weight of methylene chloride, and the cellulose triacetate solution to which the prepolymer solution is slowly added has been further diluted with an equal weight of methylene chloride. The resulting clear solution of curable copolymer is then ready for casting or drawing films.

The details are tabulated below. The column headed "12% RB CA$_3$" has reference to a solution of high-molecular-weight cellulose triacetate, containing 12% by weight of cellulose triacetate, dissolved in methylene chloride. This celluose triacetate has an A.V. of 61.8, an I.V. of 1.96 d/g., and contains an average of about 0.10 free hydroxyl group per anhydroglucose unit in the cellulose molecule. "MeCl$_2$" in the column headings means methylene chloride.

TABLE I

| Urethane Content, Percent | Prepolymer, g. | Additional MeCl$_2$, g. | 12% RB CA$_3$, g. | Additional MeCl$_2$, g. |
|---|---|---|---|---|
| 25 | 4 | 8 | 100 | 0 |
| 50 | 12 | 24 | 100 | 0 |
| 75 | 36 | 48 | 100 | 50 |
| 90 | 108 | 108 | 100 | 100 |

Films are drawn down on a silicone-treated glass plate by any of various available types of suitable blades including Bird blade, Baker film applicator or Gardner film-coating knife. The film-coated plates are placed on a cabinet-covered hot plate heated to 80° C. so that the films dry slowly, that is, with controlled evaporation of solvent, over a period of about 1 hour. The final cure is effected by allowing the coated plates to stand at humid room atmosphere for about 48 hours. The cured films have a thickness of about 3–4 mils.

The values for tensile strength and percent elongations of the cured films are tabulated below:

| Film of Copolymer Containing | Tensile Strength, p.s.i.g. | Percent Elongation |
|---|---|---|
| 25% Urethane | 827–1,288 | 206–258 |
| 50% Urethane | 7,200–8,700 | 49–75 |
| 75% Urethane | 4,600–6,900 | 237–258 |
| 90% Urethane | 5,100–6,700 | 390–600 |

Example 3

This example illustrates the production of other curable cured copolymer compositions of the invention and the tensile strengths and percent elongations of films of the cured copolymers. For purpose of comparison films of 100% high-molecular-weight cellulose triacetate and of 100% polyesterurethane are also prepared and tested. The copolymers containing from 0% to and including 50% urethane (i.e., polyesteruethane) are prepared as described under paragraph A of Example 2; those containing from above 50% up to and including 75% urethane are prepared as described under paragraph B of Example 2; while those containing from above 75% up to and including 100% polyesterurethane are prepared as described under paragraph C of Example 2. The foregoing percentages of urethane, when other than 0% or 100%, are calculated percentages. The films are drawn and cured as described in Example 2. Higher-molecular-weight cellulose triacetates of four slightly different types are used. All had A.V.'s between 61.5 and 61.8; and I.V.'s between 1.7 and 2.0.

The results of physical tests are given in Table II. The polyester D–6 to which reference is made in the table is the same polyester employed in Examples 1 and 2. Polyester D–7, also referred to in the table, has an Acid No. of about 0.2, while it hydroxyl No. is about 44. Both of these polyesters are commercially available products, being sold by Rubber Corporation of America, New South Road, Hicksville, N.Y.

TABLE II

| | Tensile Strength, p.s.i.g. | Percent Elongation |
|---|---|---|
| 100% CA$_3$–1 | 10,640 | 7.1 |
| 88% CA$_3$–1 / 12% Polyurethane from Polyester D–7 | 11,490 | 13.7 |
| 80% CA$_3$–2 / 20% Polyurethane from Polyester D–7 | 13,679 | 11 |
| 80% CA$_3$–3 / 20% Polyurethane from Polyester D–7 | 19,860 | 23 |
| 80% CA$_3$–2 / 20% Polyurethane from Polyester D–6 | 14,170 | 15 |
| 50% CA$_3$–4 / 50% Polyurethane from Polyester D–7 | 8,074 | 64 |
| 50% CA$_3$–2 / 50% Polyurethane from Polyester D–7 | 11,250 | 26 |
| 25% CA$_3$–4 / 75% Polyurethane from Polyester D–7 | 6,337 | 240 |
| 25% CA$_3$–2 / 75% Polyurethane from Polyester D–7 | 9,866 | 52 |
| 10% CA$_3$–2 / 90% Polyurethane from Polyester D–7 | 10,273 | 65 |
| 10% CA$_3$–4 / 90% Polyurethane from Polyester D–7 | 5,753 | 481 |
| 100% Polyurethane from Polyester D–7 | 3,660 | 1,980 |

The data presented in Table II shows the high modulus and low elongation characteristics of cellulose triacetate films. It also shows the low modulus, tensile strength and high elongation of polyesterurethane films, and the variations in properties that are obtained when the components of the compositions are varied between 0 to 100% of the one to 100% to 0% of the other. Quite surprisingly and unobviously, the incorporation of even a relatively small amount (e.g., about 12 to 30%, and specifically about 20%) of a urethane component, more particularly a polyesterurethane component, into a high-molecular-weight cellulose triacetate effects an actual increase in both tensile strength and percent elongation characteristics. See, for instance, the tensile strengths and the percent elongations of the first four copolymers listed in Table II as compared with that of the film of 100% CA$_3$.

Instead of using the particular hydroxyl-terminated polyesters employed in Examples 1, 2 and 3, one may substitute any of the other hydroxyl-terminated polyesters, nunmerous examples of which have been given hereinbefore. Thus one may substitute in the prior examples the polyester produced and sold by Mobay Chemical Company under the name of Multron R–16 and which is a polyester of diethylene glycol and adipic acid. It has a molecular weight of about 2500, and Acid No. of 1.5 (maximum) and a Hydroxyl No. of 41–47. Similar results are obtained.

Example 4

This example illustrates the preparation of copolymers of cellulose triacetate containing some free hydroxyl groups and a polyetherurethane.

The procedure for making the polyetherurethane is the same as that described under Example 1 with regard to the preparation of Sample No. 2 with the exception that 20 g. of Pluracol P–2010 is used in place of 20 g. of R. C. Polyester D–6. Pluracol P–2010 is a polyether produced and sold by Wyandotte Chemicals Corporation, Wyandotte, Mich., and is polyoxyalkyleneglycol having an average molecular weight of about 2000.

The procedure for making a copolymer of the resulting prepolymer and a high-molecular-weight $CA_3$ containing some free hydroxyl groups is the same as that described under A of Example 2 with the exception that the proportions are such as to provide copolymers containing 20% and 40% by weight of $CA_3$ segments; and, also, the $CA_3$ is diluted with about an equal volume of methylene chloride. Films are cast from solutions of these copolymers and cured as described in Example 2. The tensile strengths and percent elongations are shown in Table III.

TABLE III

| | Tensile Strength, p.s.i.g. | Percent Elongation |
|---|---|---|
| 20% $CA_3$ 80% Polyetherurethane | 9,200 | 27 |
| 40% $CA_3$ 60% Polyetherurethane | 6,600 | 33 |

Various other polyethers can be used in making the polyetherurethane instead of the particular polyether employed in this example. Numerous examples of such polyethers have been given hereinbefore.

Example 5

This example illustrates the improvement in dyeability, especially toward disperse and basic dyes, that is obtained when urethane segments or units are introduced into high-molecular-weight $CA_3$.

Films are prepared as described under Example 3 of 100% $CA_3$ containing some free hydroxyl groups, and of copolymers of $CA_3$ with a polyesterurethane in proportions such that the amount of the latter in the copolymer is (on a calculated basis) 10%, 20%, 50% and 90% by weight of the copolymer. The cured films of 100% $CA_3$ and of copolymers of 90% $CA_3$ and 10% polyesterurethane are soluble in methylene chloride. The remaining cured copolymer films are insoluble (with swelling) in methylene chloride.

The films are tested for dyeability using both disperse and basic dyes. The disperse dye is Eastman Blue BNN (Color Index No. Disperse Blue 3), while the basic dye is Sevron Blue. The films are cut into samples about 1-inch square for the dye test.

Dyeing is done in a 200-ml. dyebath containing about 1% by weight of the dye based on the weight of the 1-inch squares of cured film. The films are boiled in the bath for about 5 minutes, removed from the bath, washed in water until free of excess dye, air-dried and examined.

The 100% $CA_3$ films are almost perfectly clear. The urethane-containing films are all dyed blue. The depth of color increases, both with the disperse dye and the basic dye, of the urethane-containing samples varies with the increase in the urethane content of the film.

Example 6

Example 4 is repeated with the exception that, instead of using 2.8 g. of tolylene diisocyanate (TDI) in making a prepolymer containing 4% free —NCO, there is employed an equivalent molar amount of 4,4'-methylene-bis(phenylisocyanate). Similar results are obtained.

Instead of using TDI as in Example 1 through 5, or 4,4'-methylene-bis(phenylisocyanate) as in this example, one may substitute other polyisocyanates, more particularly diisocyanates, numerous examples of which were given in a portion of this specification prior to the examples.

Example 7

This example illustrates the preparation of a copolymer dope that is useful in spinning, more particularly dry-spinning, to form a filamentary copolymer of the invention.

A dope of $CA_3$ containing some free hydroxyl groups, an A.V. of about 61.6 and an I.V. of about 1.8 is first prepared by dissolving 800 g. of said $CA_3$ in 4000 g. of methylene chloride. The mixture is stirred until too viscous for further stirring, after which it is placed in a Dry Ice freezing unit for about 16 hours. The pressure vessel containing the dope is then tumbled for about 72 hours.

A prepolymer dope is prepared as follows: 200 g. of R.C.A. Polyester D–6 (see Example 1 for its composition and characteristics) is charged to a 3-necked flask and heated under a vacuum of 100 mm. Hg and at 130°–150° C. for 30 minutes. During the last 5 minutes of heating the vacuum is pulled down to less than 1 mm. Hg at 140° C. After cooling to 70° C. there is added, under a reduced pressure of 100 mm. Hg, 25 ml. (28 g.) of TDI. The mixture of polyester and TDI is allowed to react while stirring the reaction mixture but keeping the temperature below 80° C. by positive cooling. The temperature is allowed to cool to about 50° C. and 1 g. of dibutyltin dilaurate (catalyst) is then added. The resulting exotherm causes the temperature to rise rapidly but it is kept below 80° C. The mixture is stirred for 1 hour while allowing the reaction mass to cool. Stirring is stopped, and bubbles in the prepolymer are allowed to "settle-up" while maintaining the prepolymer under a pressure of 100 mm. Hg.

While maintaining the prepolymer under an atmosphere of dry argon, about 300 g. of methylene chloride is added thereto in order to dilute the prepolymer for addition to the above-described dope of $CA_3$.

The solution of prepolymer is added to the pressure vessel containing the $CA_3$ dope, immediately tumbled at ambient temperature for about 8 hours and placed in a Dry-Ice freeze chest about 16 hours. After tumbling for about another 8 hours at ambient temperature to assure complete reaction between the prepolymer and the $CA_3$, the copolymer dope is allowed to stand undisturbed in the pressure container while gas bubbles separate and until the apparatus is ready for dry spinning. A sample of the copolymer dope taken for analysis shows that it contains 19.1% by weight of copolymer solids.

After filtration the copolymer dope is dry spun employing what is essentially a conventional dry-spinning system for converting solutions of filament-forming thermoplastic polymers, e.g., cellulose organic ester solutions, into filaments. Such dry-spinning apparatus is well-known and need not be illustrated and described here.

The copolymer dope at a temperature of about 38°–39° C. is extruded downwardly through the single opening of a spinnerette into the evaporative atmosphere of a spinning cell. The diameter of the opening of the spinnerette is 0.5 mm. (500 microns). The inner wall of the cell is maintained at a temperature of about 100°–125° C. by means of a fluid medium that circulates around the outer wall of the cell. A current of preheated anhydrous gas, specifically thoroughly dried air, at about 60–80° C. is introduced into the cell, more particularly at the bottom of the cell, and passes upwardly countercurrent to the monofilament that is passing downwardly from the opening of the spinnerette. Instead of introducing the air at the bottom of the cell it may, if desired, be passed into the top of the cell and then passed concurrently downwardly with the downwardly moving filament. Also, to minimize the possibility that any moisture in the circulating air may cause premature gelation or curing of the copolymer dope at the face of the spinnerette and clogging of the opening, one may use a dry inert gas such as dry argon, helium, nitrogen or the like alone or admixed with dry air.

The linear extrusion speed is at the rate of about 130 meters per minute, and it is taken up at the rate of about 135 meters per minute. After take-up, the monofil of curable copolymer is cured by aging in humid room atmosphere at ambient temperature for 14 days.

A control monofil is prepared from a control dope of 100% $CA_3$ in exactly the same manner described above for the preparation of the copolymer dope and monofil, including exposure to humid room atmosphere at ambient temperature for 14 days.

Testing of the two monofils shows that the copolymer monofil has both higher tensile strength and higher percent elongation than the monofil of 100 $CA_3$, as well as much better dyeability towards both basic and disperse dyes.

In a manner similar to that described above for the preparation of a monofilament, one can produce multifilament yarns. The spinning conditions may be varied as desired or as conditions may require for the production of the particular monofilament or multifilament. For example, instead of extruding at a dope temperature of about 38°–39° C. as in this example, the dope extrusion temperature may vary from ambient temperature (20–30° C.) to about 100° C. The extrusion speeds also may vary widely from that employed in this example depending, for instance, upon the particular dry-spinning apparatus employed, the viscosity of the dope, the temperature of the spinning cell, and numerous other influencing factors; hence the extrusion speeds cannot be stated with exactness. In producing filaments of normal form or construction, the linear take-up speeds are usually the same as or up to about 1.2 times the speed at which the solution is extruded through the jet opening.

The copolymer dope may be formed into useful filaments by wet-spinning techniques if desired.

The filament-forming composition may also comprise, in addition to one or more copolymers of the invention, other thermoplastic or solvent-soluble polymeric materials, e.g., nylon 6, nylon 66, a poly(polymethylene) amide such as polyhexamethylene terephthalamide, polyesters such as polyethylene terephthalate, acrylonitrile homopolymer and copolymers of acrylonitrile with other ethylenically unsaturated monomers, homopolymers and copolymers of olefins and of vinyl esters such as ethylene, propylene, vinyl chloride, vinylidene chloride, vinyl acetate, and the like.

As will be apparent to those skilled in the art, modifications of the present invention can be made or followed in the light of the foregoing disclosure without departing from the spirit and scope of the disclosure or from the scope of the claims.

The embodiments of the invention in which an exclusive property or privilege is claimed are defined as follows:

1. A composition comprising a copolymer which is a reaction product of reactants including
   (A) a non-cellulosic polymer containing unreacted isocyanate groups and
   (B) a high-molecular-weight cellulose triester of lower aliphatic acid, said cellulose triester containing some free hydroxyl groups, being in substantially undegraded state, and having
       (a) an average of less than about 0.29 free hydroxyl group per anhydroglucose unit in the cellulose molecule,
       (b) at least about 59% acyl groups calculated as combined lower aliphtic acid, and
       (c) an inherent viscosity of from about 1.5 to about 3.0 dl/g.,
and the reactants of (A) and (B) being employed in weight percentages ranging from about 10:90 to about 90:10.

2. A composition comprising a copolymer which is a reaction product of reactants including
   (A) a polyurethane containing unreacted isocyanate groups and
   (B) a high-molecular-weight cellulose triacetate containing some free hydroxyl groups, being in substantially undegraded state, and having
       (a) an average of less than about 0.29 free hydroxyl group per anhydroglucose unit in the cellulose molecule,
       (b) at least about 59% acetyl groups calculated as combined acetic acid, and
       (c) an inherent viscosity of from about 1.5 to about 3.0 dl/g.,
the reactants of (A) and (B) being employed in weight percentages ranging from about 10:90 to about 90:10.

3. A composition as in claim 2 which is in the form of a film.

4. A composition as in claim 2 which is in the form of a fiber.

5. A composition as in claim 2 wherein the reactants of (A) and (B) are employed in weight percentages ranging from about 50:50 to about 50:80.

6. A composition as in claim 2 wherein the reactants of (A) and (B) are employed in weight percentages of about 20% of (A) and about 80% of (B).

7. A copolymer which is a reaction product of reactants consisting essentially of
   (A) a polyurethane containing unreacted isocyanate groups and
   (B) a high-molecular-weight cellulose triacetate containing some free hydroxyl groups, being in substantially ungraded state, and having
       (a) an average of less than about 0.12 free hydroxyl group per anhydroglucose unit in the cellulose molecule,
       (b) at least about 61% acetyl groups calculated as combined acetic acid, and
       (c) an inherent viscosity of from about 1.7 to about 3.0 dl/g.,
and the reactants of (A) and (B) being employed in weight percentages ranging from about 50:50 to about 50:80.

8. A copolymer as in claim 7 wherein the reaction product is a curable reaction product of the defined reactants in the defined range of weight percentages.

9. A copolymer as in claim 7 wherein the reaction product is a cured reaction product of the defined reactants in the defined range of weight percentages.

10. A copolymer as in claim 7 wherein the polyurethane of (A) is a reaction product of an organic polyisocyanate and at least one polyester having an average molecular weight within the range of from about 250 to about 5000 and containing terminal functional groups reactive with an isocyanate.

11. A copolymer as in claim 10 wherein the organic polyisocyanate is tolylene diisocyanate.

12. A copolymer as in claim 7 wherein the polyurethane of (A) is a reaction product of an organic polyisocyanate and at least one polyether having an average molecular weight within the range of from about 250 to about 5000 and containing terminal functional groups reactive with an isocyanate.

13. A copolymer as in claim 12 wherein the organic polyisocyanate is tolylene diisocyanate.

14. A composition comprising a copolymer which is a reaction product of reactants including
   (A) an organic polyisocyanate,
   (B) a non-cellulosic polymer containing terminal functional groups processing active hydrogen, and
   (C) a high-molecular-weight cellulose triester of a lower aliphatic acid, said cellulose triester containing some free hydroxyl groups, being in substantially undegraded state, and having
       (a) an average of less than about 0.29 free hydroxyl group per anhydroglucose unit in the cellulose molecule,
(b) at least about 59% acyl groups calculated as combined lower aliphatic acid, and
(c) an inherent viscosity of from about 1.5 to about 3.0 dl/g., the reactant of (C) constituting from about 10 to about 90 percent by weight of the total weight of the reactants of (A), (B) and (C).

No references cited.

WILLIAM H. SHORT, *Primary Examiner.*

J. J. NORRIS, *Assistant Examiner.*